United States Patent [19]

Emma et al.

[11] Patent Number: 4,763,245
[45] Date of Patent: Aug. 9, 1988

[54] BRANCH PREDICTION MECHANISM IN WHICH A BRANCH HISTORY TABLE IS UPDATED USING AN OPERAND SENSITIVE BRANCH TABLE

[75] Inventors: Philip G. Emma, Danbury, Conn.; James H. Pomerene, Chappaqua, N.Y.; Gururaj S. Rao, Peekskill, N.Y.; Rudolph N. Rechtschaffen, Scarsdale, N.Y.; Howard E. Sachar, New Paltz, N.Y.; Frank J. Sparacio, North Bergen, N.J.

[73] Assignee: International Business Machines Corporation, Armonk, N.Y.

[21] Appl. No.: 793,057

[22] Filed: Oct. 30, 1985

[51] Int. Cl.⁴ .............................................. G06F 9/34
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,559,183 | 1/1971 | Sussenguth | 364/200 |
| 4,155,120 | 5/1979 | Keefer | 364/200 |
| 4,430,706 | 2/1984 | Sand | 364/200 |
| 4,500,959 | 2/1985 | Kubo et al. | 364/200 |
| 4,594,659 | 6/1986 | Guenther et al. | 364/200 |
| 4,679,141 | 7/1987 | Pomerene et al. | 364/200 |
| 4,691,277 | 9/1987 | Kronstadt et al. | 364/200 |

Primary Examiner—Raulfe B. Zache
Assistant Examiner—Eric Coleman
Attorney, Agent, or Firm—Jack M. Arnold; Terry J. Ilardi

[57] ABSTRACT

A data-dependent branch table is a mechanism that is sensitive to operands that will be tested in order to determine branch action outcomes. The data dependent branch table operates in conjunction with a branch history table to anticipate those instances where the branch history table will make an erroneous prediction, and corrects the branch history table prior to the time that the actual prediction is made.

12 Claims, 9 Drawing Sheets

UPDATING THE BHT

FIG.1A UPDATING THE BHT

FIG.3  TESTING OF OPERANDS BY THE DDBT

FIG. 5  PREPARING ENTRIES FOR THE DDBT

FIG. 6A UPDATING THE DDBT ARRAYS

FIG.6B

BRANCH PREDICTION MECHANISM IN WHICH A BRANCH HISTORY TABLE IS UPDATED USING AN OPERAND SENSITIVE BRANCH TABLE

DESCRIPTION

1. Technical Field

The invention is in the field of data processing, and specifically is directed to the processing of branch instructions in a computing machine.

1. Background Art

In high performance processors it is common practice to decompose an instruction into several steps each performed by different step-processing units. Each such unit can have the capability of accepting a specific step for successive instructions every cycle. It is common practice to thereby overlap the successive steps in executing an instruction on a cycle by cycle basis with each following instruction with a one cycle offset. Ideally, this allows one instruction to be handled each cycle even though any given instruction takes several cycles to complete.

This ideal overlap is not always possible for several reasons. A major reason is the frequent occurrence of branch instructions. These have two significant attributes: the branch may or may not be taken, introducing a temporary uncertainty as to which of two instructions is next; and if it is taken, the next instruction must be obtained from an address usually specified in the branch.

A number of patents are directed to branch prediction mechanisms, each having certain advantages and disadvantages. For example, U.S. Pat. No. 4,370,711 to Smith discloses a branch predictor for predicting in advance the result of a conditional branch instruction in a computer system. The principle upon which the system is based is that a conditional branch instruction is likely to be decided in the same way as the instructions most recent executions.

U.S. Pat. No. 4,251,864 to Kindell et al, discloses a branch predictor for manipulation of signal groups having boundaries not coinciding with boundaries of signal group storage space. When a word containing an operand boundary is transferred to the central processing unit, non-operand data is also transferred with the word. The non-operand data occurring in the boundary word is removed from the operand signal group and stored in the central processing unit. After manipulation of the operand by the central processing unit, the non-operand data is reinserted in the boundary words in the signal position previously occupied and the word group containing the manipulation or the resulting operand is stored in the memory location from which it was originally removed.

U.S. Pat. No. 3,800,291 to Cocke et al, is a branch prediction mechanism in which branch instructions may branch to the address of the information on the same or on another page. The branch instruction includes an indicator as to whether the branch address is a physical address on the same or another page, or a virtual address on another page.

U.S. Pat. No. 4,181,942 to Forster et al, discloses a program branching method and apparatus in which a special branch instruction used in a computing system serves as a conditional branch or as a non-conditional branch as determined by the state of an internal register. This special branch instruction is used for conditional branching within or at the end of a program loop and for unconditional branching outside of such a loop.

U.S. Pat. No. 3,325,785 to Stephens, sets forth a branch prediction mechanism which efficiently utilizes control storage and its access controls. A simple strategy for handling branches is to suspend overlap until the branch is fully completed: resolved as taken or not taken and if taken, the target instruction is fetched from memory. However, this strategy results in several cycles per branch which are lost from the ideal overlap. Another strategy is to make a fixed choice based on the type of branch and statistical experience as to whether the branch will be taken. When the choice indicates not taken normal overlap is continued on a conditional basis pending the actual outcome. If the choice proves wrong the conditionally initiated instructions are abandoned and the target instruction is fetched. The cycles devoted to the conditional instructions are lost as well as the cycles to fetch the target. However, the latter is often avoided by prefetching the target at the time the branch is decoded.

U.S. Pat. No. 4,435,758 to Lorie et al is targeted at mapping programs onto a SIMD (single instruction-stream, multiple data-stream) processor, and ensuring correct, and (hopefully) efficient operation of the program across all processors. An SIMD processor is comprised of many identical processors which execute identical instruction sequences on different data streams in parallel. SIMD processors provide high performance in those applications for which there are no interdependences between the various input data streams.

U.S. Pat. No. 4,477,872 to Losq et al is directed to a "decode history table." This provides a mechanism for guessing the action (but not the target) of conditional branches. The invention encompasses a table having entries comprised of a branch address, and a bit to indicate whether or not the branch was taken on its last execution. At the decode time of a conditional branch instruction, the table is searched using the address of the branch that is being decoded. If an entry is found under this address, the history bit within the entry is used to guess whether or not the branch will be taken. The guess is that the branch will have the same action as it did on its last execution.

U.S. patent application Ser. No. 728,424 filed Apr. 29, 1985 entitled, "Pageable Branch History Table", which is assigned to the assignee of the present invention is directed to a branch history table (BHT) which is substantially improved by dividing it into two parts: an active area, and a backup area. The active area contains entries for a small number of branches which the processor can encounter in the near future and the backup area contains all other branch entries. Means are provided to bring entries from the backup area into the active area ahead of when the processor will use those entries. When entries are no longer needed they are removed from the active area and put into the backup area if not already there. New entries for the near future are brought in, so that the active area, though small, will almost always contain the branch information needed by the processor. The small size of the active area allows it to be fast and to be optimally located in the processor layout. The backup area can be located outside the critical part of the layout and can therefore be made larger than would be practicable for a standard BHT.

Another strategy is embodied in U.S. Pat. No. 3,559,183 to Sussenguth, which patent is assigned to the assignee of the present invention. It is based on the observation that most branches, considered individually, are consistently either taken or not taken and if taken, will have a consistent target address. In this strategy a table of taken branches is constructed. Each entry in the table consists of the address of the taken branch followed by the target address of the branch. This table is a hardware construct and so it has a predetermined size, typically from 1024 and 4096 entries. Entries are made only for taken branches as they are encountered. When the table is full making a new entry requires displacing and older entry. This can be accomplished by a Least Recently Used (LRU) basis as in caches.

In principle, each branch in the stream of instructions being executed is looked up in the table, by its address, and if it is found, its target is fetched and becomes the next instruction in the stream. If the branch is not in the table it is presumed not taken. All actions based on the table are checked as instruction execution proceeds. If the table is found to be wrong corrections are made. If the branch predicted to be taken is not taken, the table entry is deleted. If a branch predicted not taken is taken a new entry is made for it. If the predicted target address is wrong the corrected address is entered.

In practice, the foregoing is modified slightly. It is desirable to find taken branches early enough so that the target can be fetched before or at least as soon as it is needed, so that no delay will occur in the pipeline. This condition is usually not met if the table is accessed only after a branch is located and identified. Therefore, the table is usually organized and addressed on the basis of the instruction fetching packet of the machine. Currently, this packet is a double word (DW). The practical procedure is then as follows. When the machine fetches a double word into its instruction buffer, the DW address is also supplied to the table. If an entry exists the target (DW) is fetched as soon as cache priority permits. In turn, this target DW is supplied to the table, continuing the process.

The prior art described above is called a Branch History Table (BHT) and handles a great majority of branches successfully but there is a several cycle penalty when it is wrong. For practical sizes of the table (say 256 entries or approximately 2K bytes) this penalty almost offsets the gain from its use. Although a larger table (4K entries or approximately 32K bytes would reduce the percentage of wrong predictions, hence the penalty, the problem is that the table hardware must be packaged in the speed critical instruction fetch and preparation area of the machine. It would be important to reduce rather than increase the table hardware in this area, because the more hardware that must be put in the area the longer the wiring distances and the greater the number of logic delays which must be reckoned in the critical paths determining the cycle time. These would, of course, lengthen the cycle time and a longer cycle time works constantly to decrease machine speed. Few organizational improvements, the BHT included, are good enough to offset much of an increase in cycle time which they may cause. Therefore, improvements are sought which will not place more hardware in the critical area.

According to the present invention, a data-dependent branch table (DDBT) is described that is sensitive to those operands that will be tested in order to determine branch outcomes. The DDBT operates in conjunction with the branch history table (BHT), and it:

(1) Contains an entry for each pertinent byte comprised of:
  (a) the address of the byte,
  (b) the address of the branch instruction whose action is determined by the byte,
  (c) the target address of the branch, should the branch be taken,
  (d) an encoding that specifies a means for testing the pertinent byte to determine, for a specific branch, the branch action,
  (e) an action bit that specifies the outcome of the branch test relative to the last instance of the pertinent byte;
(2) Is searched by each store operation to determine whether or not (via a match against (a) above) the store is being made to one of the bytes in the table, and if a match is found;
(3) Is able to generate the next branch outcome by using (d) above in conjunction with the new instance of the byte being stored, and by comparing the new outcome with (e) above;
(4) Is able to determine if the next execution of the branch specified by (b) above, should it occur, have the same action as the previous execution, and if not;
(5) It makes an entry in the BHT, or deletes an entry from the BHT (whichever is appropriate) using (b) and (c) above, so that on the next occurrence of the branch, the BHT will make a correct prediction.

BRIEF SUMMARY OF THE INVENTION

In accordance with the present invention, a data dependent branch table is set forth that is sensitive to those operands that will be tested in order to determine branch action outcomes. The data dependent branch table operates in conjunction with a branch history table to anticipate those instances where the branch history table will make an erroneous prediction, including means to correct the branch history table prior to the time the actual prediction is made.

DESCRIPTION OF THE PREFERRED EMBODIMENT

A Branch History Table (BHT) is used to predict the outcomes of branches by guessing that the subsequent outcome of any given branch will be the same as the current outcome of that branch. The basic BHT contains entry pairs that consist of the address of the branch instruction and the target instruction for all taken branches. Thus, implicit in a BHT hit is the belief that the address that caused the hit is the address of a taken branch.

Since many branches do change action on subsequent executions, there is a need to update the BHT in this event to reflect new guesses. By update, it is meant that not taken branches that have been guessed taken should have their associated entries removed from the BHT, and that taken branches that were missed should have entries inserted into the BHT.

All branches that change their action are conditional branches, and what causes the action to change is that data used to set the condition code has changed. According to the present invention, a Data Dependent Branch Table (DDBT) is described which monitors stores made to pertinent data, and updates the BHT in the event that such a store will cause a dependent branch to change action.

The following describes a particular implementation that is loosely coupled to the BHT through a mechanism used to update the BHT in the event of a branch wrong guess. Thus, this particular implementation can be appended to a standard BHT without any restructuring of the BHT, and with very minimal changes to any existing control circuitry.

For clarity of presentation, a description of a possible BHT updating scheme is first described. The DDBT is then described including a method of coupling this to the BHT through updating hardware. Finally, it is shown how to insert and delete entries from the DDBT.

Figure 1A:
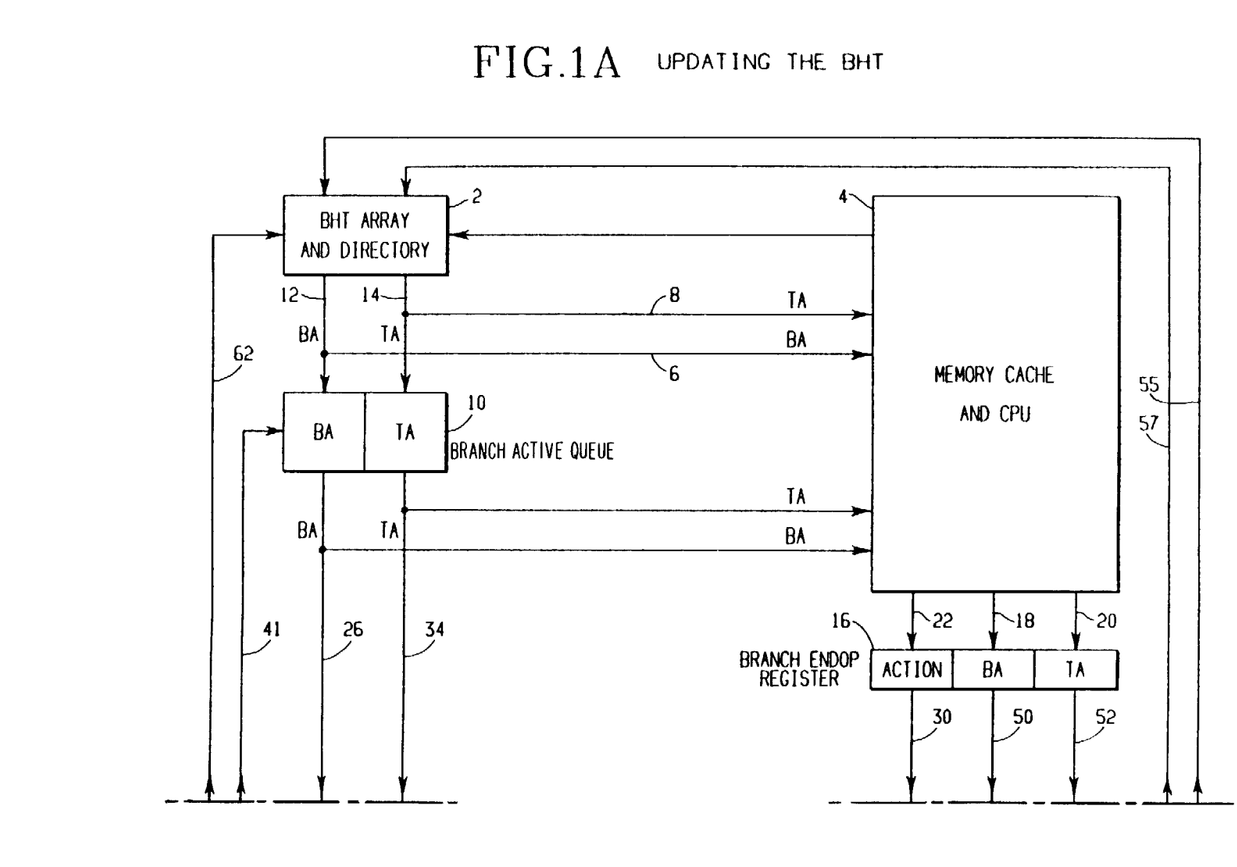
FIG. 1 is comprised of FIGS. 1A and 1B, viewed with FIG. 1A on the top and FIG. 1B on the bottom, and is a block diagram representation of the branch history table updating logic.
Figure 1B:
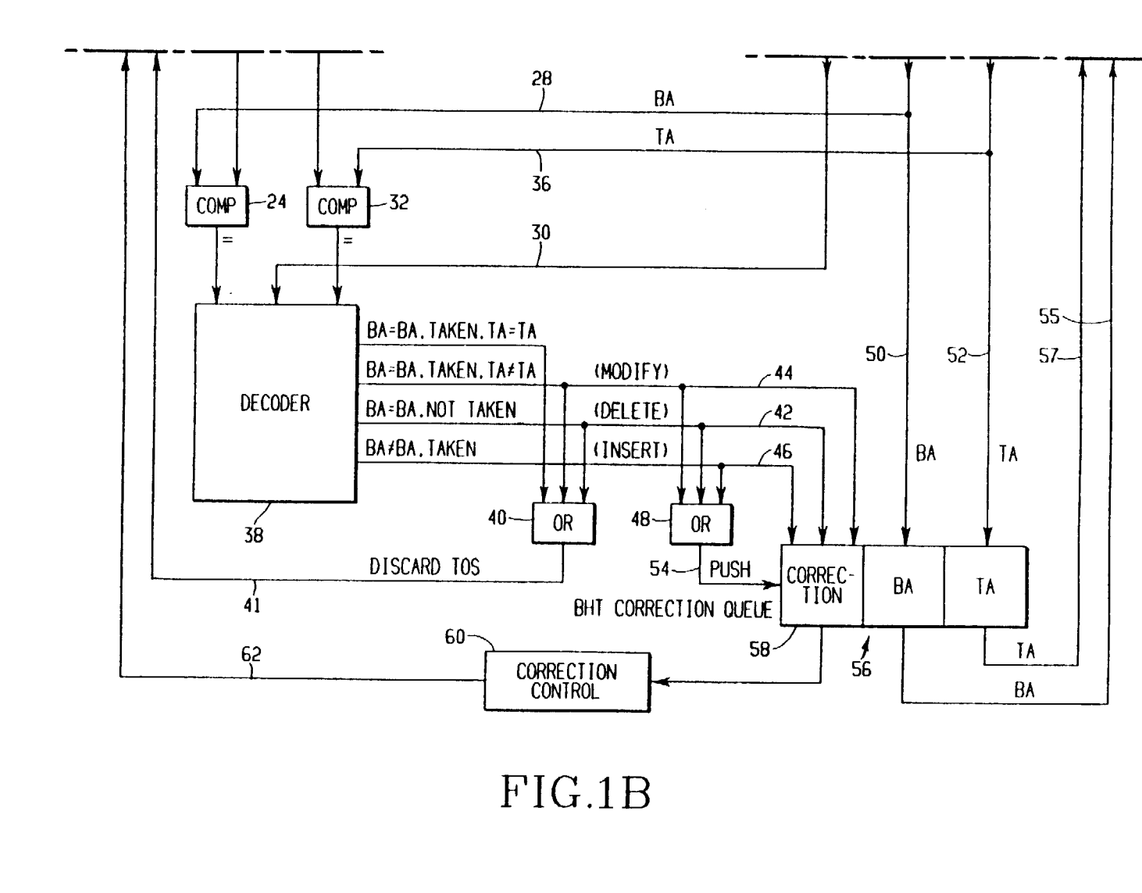

FIG. 1 shows one implementation of BHT updating hardware. When a BHT 2 has a hit, it sends the Branch Address (BA) and Target Address (TA) to a memory cache and CPU 4 via lines 6 and 8, respectively, so that instruction fetching can be redirected after the branch is fetched. The BA,TA pair is also provided to a Branch Active Queue (BAQ) 10 via lines 12 and 14, respectively. The BAQ 10 contains BA,TA pairs for all BHT hits that have not yet been confirmed via endopting. The BAQ 10 serves two purposes, namely, entries in the queue are used to align and select instructions from the instruction buffer included in the memory cache and CPU 4, and entries in the queue are compared to branches that endop to assess whether or not the BHT 2 needs to be updated.

At the time that a branch is endopted in unit 4, the branch address (BA) and target address (TA) for the branch, as well as an ACTION bit that specifies whether or not the branch was taken are provided to a Branch Endop Register (BER) 16 via lines 18, 20 and 22, respectively. Since every executed branch passes through register 16, and only branches that are guessed taken pass through the BAQ 10, the BA entry from the BER 16 will only compare equal to the BA entry from the BAQ 10 if the branch in question was guessed taken. This comparison is performed by comparator 24, which compares the top of stack (TOS) entry on line 26 to the BER entry on line 28. On equal comparison, the ACTION bit on line 30 from the BER 16 is used to verify the action guess of "taken". For taken branches that were guessed taken, the target address is tested by comparator 32 to determine whether the BHT 2 guessed the correct target as well by comparing TA on line 34 from BAQ 10 and TA on line 36 from BER 16.

Decoder 38 takes the ACTION bit on line 30 from the BER 16 as well as the results of the two comparisons, by comparators 24 and 32, to determine four conditions of interest. Whenever the BA of the BAQ 10 is equal to the BA of the BER 16 as tested by OR circuit 40, the top of stack of the BAQ can be discarded, i.e., the entry corresponds to a branch that was guessed taken that has endopted. However, if the corresponding branch was not taken, then the BHT entry must be deleted as indicated on line 42 as well, or, if the corresponding branch was taken to a different target, then the BHT must be modified as indicated on line 44 to reflect the correct target address. If the BA of the BAQ 10 is not equal to the BA of the BER 16, this corresponds to a BHT miss. In the case that the branch was taken, a new entry must be inserted, as indicated on line 46, into the BHT.

OR circuit 48 identifies those cases that require insertion of an entry into the BHT, deletion of an entry from the BHT, or modification to an existing entry in the BHT. The OR circuit 48 causes the BA,TA pair on lines 50 and 52, respectively, from the BER 16 to be pushed by the Output of OR gate 48 on line 54 onto the BHT Correction Queue (BCQ) 56, along with an encoding of the appropriate correction in network 58 that is to be made. Entries in the BCQ 56 correspond to outstanding updates that must be made to the BHT 2. A correction control circuit 60 makes these updates, thereby retiring entries in the BCQ 56, and updating BHT 2 via line 62.

The Data Dependent Branch Table (DDBT) is a table of entries, each comprised of six fields. These entries are relevant to a subset of the entries in the BHT 2, and are used to update the BHT 2 in the event that a test operand that determines a branch is changed. The fields within each entry are:

(1) OADDR—The address of the operand that is tested,
(2) BADDR—The address of the branch that is dependent on the operand specified by OADDR,
(3) TADDR—The address of the target to the branch instruction specified by BADDR,
(4) TEST—An encoding that specifies the manner in which the operand specified by OADDR is tested to determine the outcome of the branch specified by BADDR,
(5) ACTION—A bit that specifies whether or not the branch specified by BADDR was taken on its last execution, and
(6) V—A validity bit that signifies that the entry is not a null entry.

The table can be organized in any reasonable manner. The manner specified herein is chosen merely for illustrative purposes, and is not meant to limit the breadth of the invention in any way.

For purposes of description, the types of operand tests that are considered are limited to instructions in the storage and immediate (SI) format that set the condition code, i.e., TM, CLI, NI, OI, and XI. Once again this limitation was chosen for simplicity of illustration, and in no way limits the range of application for this invention. These instructions test single byte operands in storage, and the DDBT contains entries for these bytes. Whenever an entry is released from the pending store buffer, the address of the entry is used to search the DDBT to see if the operand that is being stored is a test byte. If this is found to be the case, the byte that is being stored is tested in the manner specified by TEST above to determine whether the BHT should be updated in anticipation of subsequent branch action based on the byte.

Figure 2A:
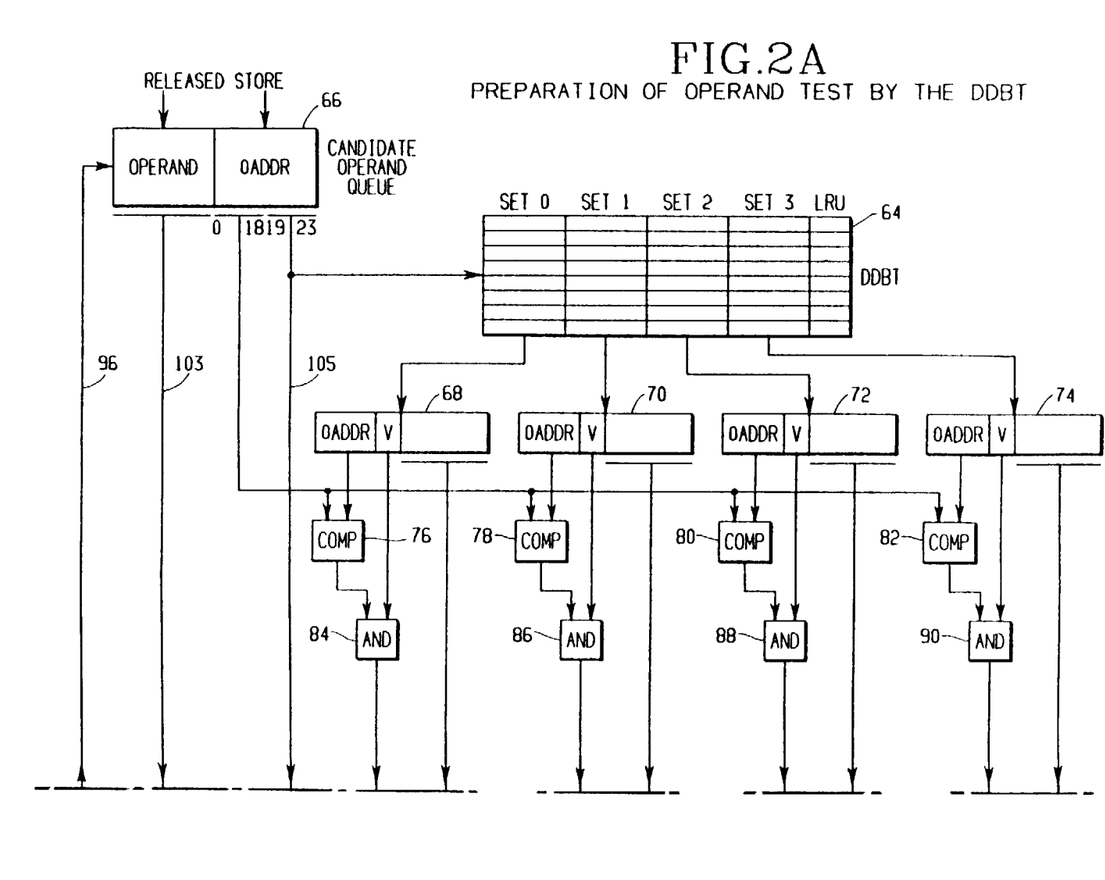
FIG. 2 is comprised of FIGS. 2A and 2B, viewed with FIG. 2A on the top and FIG. 2B on the bottom, and is a block diagram representation of the data dependent branch table logic, which illustrates how operands are prepared for testing.
Figure 2B:
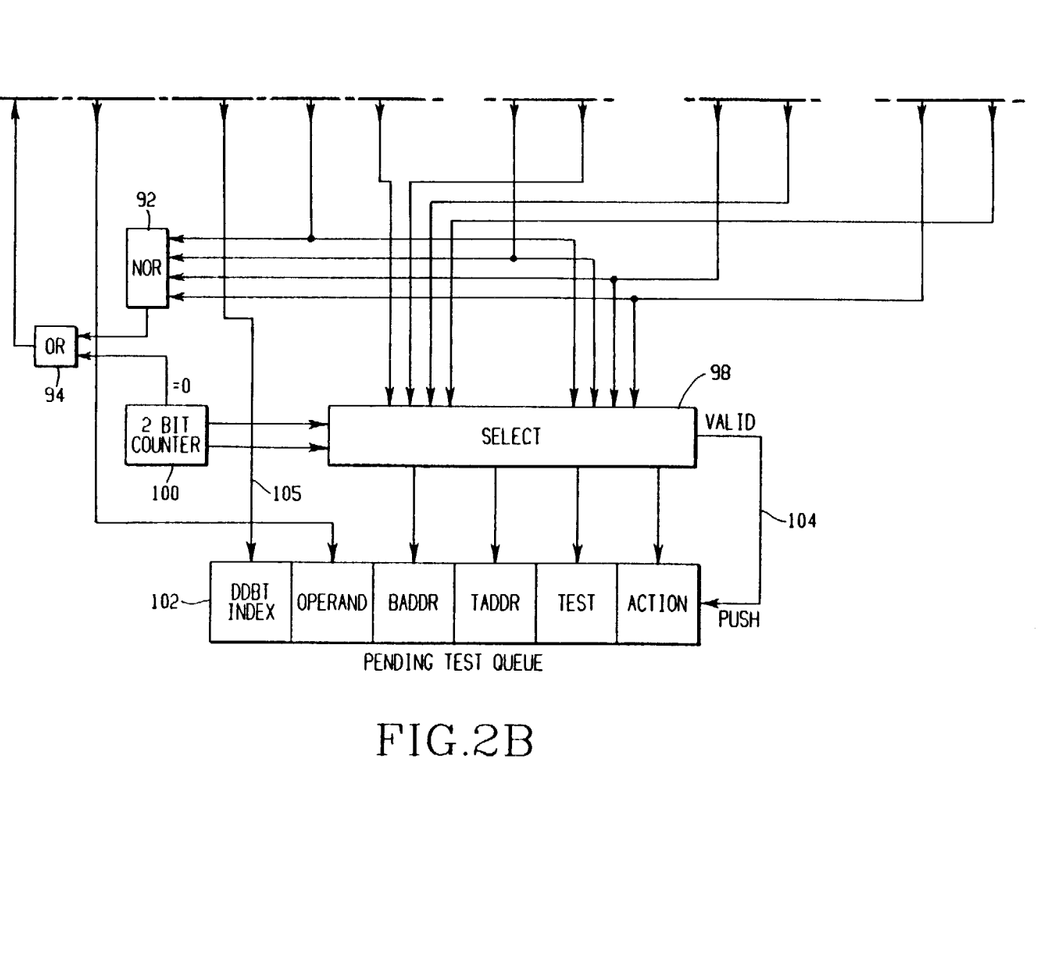

FIG. 2 shows a DDBT 64, and the way in which operands are prepared for testing. When a store request is released from the pending store buffer (not shown), it is placed in a Candidate Operand Queue (COQ) 66. The COQ 66 is specific to the DDBT 64, and it serves as a temporary buffer to hold operands that may be in the DDBT 64. The DDBT 64 is illustrated as having 128 entries, organized as a 32 by 4 way set associative table. The low order 5 bits of the operand address from the COQ 66 are used to read an entry from each set. Since any specific operand may affect more than one branch, there may be multiple entries for any given operand. To allow for this, the low order 2 bits of the halfword address BADDR (bits 21 and 22) are used to determine the set as shown in more detail in FIG. 3, and FIG. 6. Although this particular organization does not require a DDBT directory, a possible alternative is a variation on this scheme which allows for LRU replacement.

The four entries from the DDBT array 64 are loaded into temporary buffers, 68, 70, 72 and 74. The OADDR fields from each of these entries actually consist of bits 0 through 18 of the operand addresses. This is because bits 19 through 23 are implicit in the congruence class. Thus, bits 0 through 18 of the entry in the COQ 66 are compared with the OADDR fields in each of the four candidate set entries to determine if any of these candidates are, in fact, specified by the COQ entry. The comparisons are performed by comparators 76, 78, 80 and 82. A further screening is accomplished by AND circuits 84, 86, 8 and 90 to assure that the valid bit is set for those candidates that match.

If no valid candidates match the OADDR from the COQ 66 as determined by NOR circuit 92 responding to the outputs from AND circuits 84, 86, 88 and 90, then this outcome is conveyed through OR circuit 94 via line 96 to COQ 66 and the Top Of Stack (TOS) entry is discarded. However, if any valid candidates are found to match, then they are gated through a Selector 98. The gating is performed by a two bit counter 100, which polls each entry by set, and pushes only those entries that are valid and match onto the Pending Test Queue (PTQ) 102 in response to the PUSH signal. Signal 104 corresponds to the outputs of AND circuits 84, 86, 88 and 90, depending on which set is currently being polled.

When all four sets are polled, and counter 100 returns to the ZERO state, OR circuit 94 causes the TOS entry on the COQ 66 to be discarded, and the above process is repeated for the next candidate entry. The PTQ 102 is a queue of all tests that must be performed to determine whether or not the BHT should be updated. Note that when an entry is pushed onto the PTQ 102, it is pushed along with the operand to be tested (from the COQ 66), as well as the low order five bits of the operand address (the DDBT Index field). The DDBT Index is used to update the DDBT if the outcome of the test is other than that specified by the ACTION bit.

Figure 3:
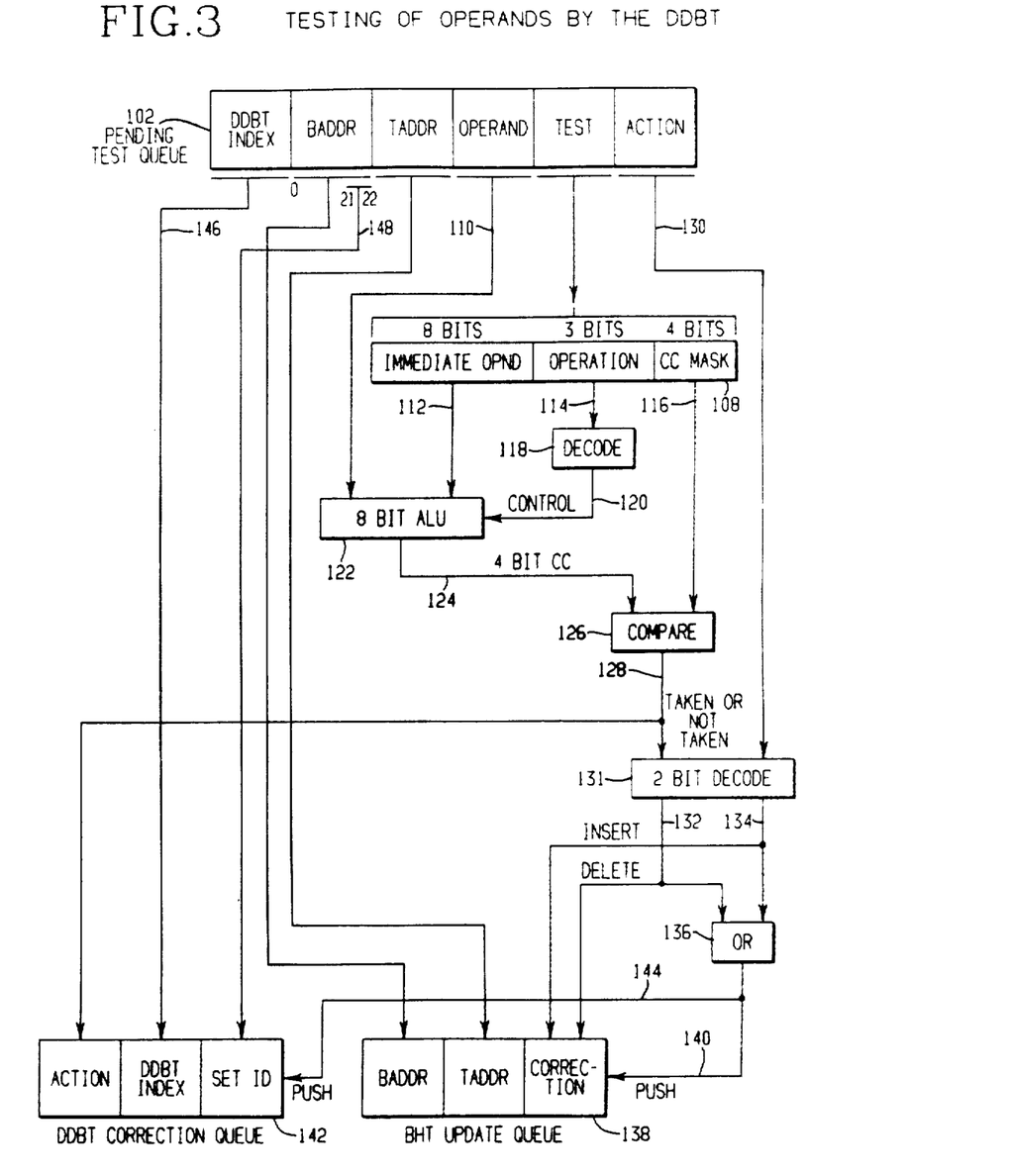
FIG. 3 is a block diagram representation of the logic which determines whether an update of the branch history table is required.

FIG. 3 demonstrates how entries in a pending test queue (PTQ) 102 are tested to determine whether an update to the BHT is required. Since this particular embodiment restricts the tests to the instructions TM, CLI, NI, OI and XI, the TEST field in the PTQ entry is comprised of three subfields as shown in the magnified TEST field 108. Note that in other possible implementations where more test instructions are implemented, the TEST field 108 may have a slightly modified format, and the particular format shown here is arbitrary. Since these five instructions operate on a storage operand (in the OPERAND field 110 of the PTQ 102, and an immediate operand (within the instruction formats of the TM, CLI, NI, OI, and XI), the TEST field of the PTQ 102 must contain a subfield as indicated on line 112, in which the immediate operand is specified. This requires eight bits. Since there are five possible test instructions, a three bit subfield of the TEST field as indicated on line 114 is used to contain an encoding of the test that is to be performed. Since the operation in question is used to set a condition code that will be tested against a mask field specified by the relevant branch instruction, the condition code mask field as indicated on line 116 must also be included as a subfield of the TEST field.

At the start of a test cycle, the Operation subfield 114 of the TEST field 108 of the entry on the front of the PTQ 102 is decoded by decoder 118. The decoder 118 provides control inputs on line 120 to an eight bit Arithmetic Logic Unit (ALU) 122. The ALU performs the appropriate operation on inputs 110 and 112, and outputs a four bit condition code (CC) on line 124 that would result from this operation in the CPU. The condition code output 124 is compared to the condition code mask field 116 by a comparator 126 to determine what the branch outcome on line 128 would be. This outcome on line 128, as computed by the test circuitry, is then compared to the ACTION bit on line 130 by a two bit decoder 131. Since the ACTION bit 130 indicates whether or not the branch was taken on its last execution, and the test output bit 128 indicates whether or not the branch will be taken on its next execution, decoder 131 can determine two cases that require a modification to the BHT.

If the ACTION 130 specifies that the branch was taken on its last execution, and the test output 128 specifies that the branch will not be taken subsequently, then it is known that the BHT entry for this branch should be deleted as indicated on line 132. If the ACTION bit 130 specifies that the branch was not taken on its last execution, and the test output 128 specifies that the branch will be taken subsequently, then it is known that a new BHT entry for this branch should be inserted as indicated on line 134. OR circuit 136 detects either of these cases, and pushes appropriate information onto the BHT Update Queue (BUQ) 138 via line 140, and onto the DDBT Correction Queue (DCQ) 142 via line 144.

Entries in the BUQ 138 represent updates that are to be made to the BHT. These entries consist of the address of the branch for which the update is relevant (BADDR), the target address of this branch (TADDR), and the nature of the update (i.e., insertion or deletion). Entries in the DCQ 142 represent updates that are to be made to the DDBT, i.e., the action bit of the relevant DDBT entry must be changed. These entries consist of the new action bit 128, the DDBT Index on line 146 from the PTQ 102 (which identifies the congruence class of the DDBT entry), and the Set ID on line 148 from PTQ 102 which is bits 21 and 22 from the BADDR field of the PTQ entry. The Set ID on line 148 identifies the set into which the DDBT entry that is to be modified is mapped.

Figure 4:
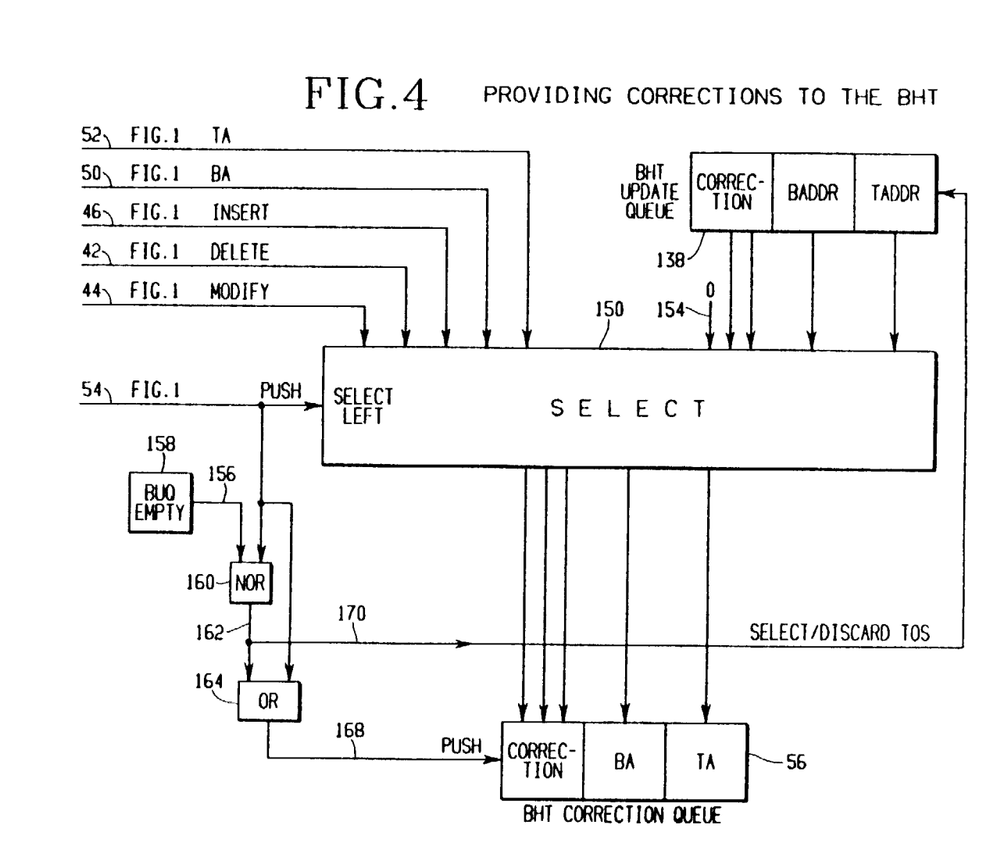
FIG. 4 is a block diagram representation of the logic which determines how entries in the branch history table update queue are made available to the branch history table logic.

FIG. 4 shows how entries in the BUQ 138 are made available to the BHT updating hardware. FIG. 4 represents the total amount of modification that is required to FIG. 1 in order to allow the DDBT mechanism to aid the BHT. Referring to FIG. 1, all input lines to the BCQ 56 must be cut and routed to FIG. 4. This includes lines 50 and 52 from the BER 16, lines 42, 44 and 46 from the decoder 38, and line 54 from the OR circuit 48. Referring now to FIG. 4, all of these lines with the exception of 54 are inputs to a data selector circuit 150 and line 54 is used to select these inputs instead of the inputs from a BUQ 138.

Note that a "0" input 154 is required on the right side of the selector 150 as a counterpart to the MODIFY signal 44, since entries in the BUQ 152 only pertain to insertions or deletions. Note also that line 54 give preference to the left inputs, so that entries from the BUQ 152 will only be gated through when there is no entry outstanding in the BAQ 10 of FIG. 1. This preferential treatment is given arbitrarily, however it has the advantage that the circuitry which pops the BAQ 10 does not require modification.

A status control signal on line 156 from BUQ Empty network 158, is combined with the PUSH signal on line 54 in NOR circuit 160 to select the top entry in the BUQ 138. The output signal 162 from gate 160 is combined with signal 54 in OR circuit 164 to push the selected input entry onto the BHT Correction Queue (BCQ) 56 via line 168. If the selected input is from the BUQ 138, then the signal on line 170 is used to pop the BUQ 138 following the push onto the BCQ 56 via line 168. Entries in the BCQ 56 are used to modify the BHT in the manner described above.

Figure 5:
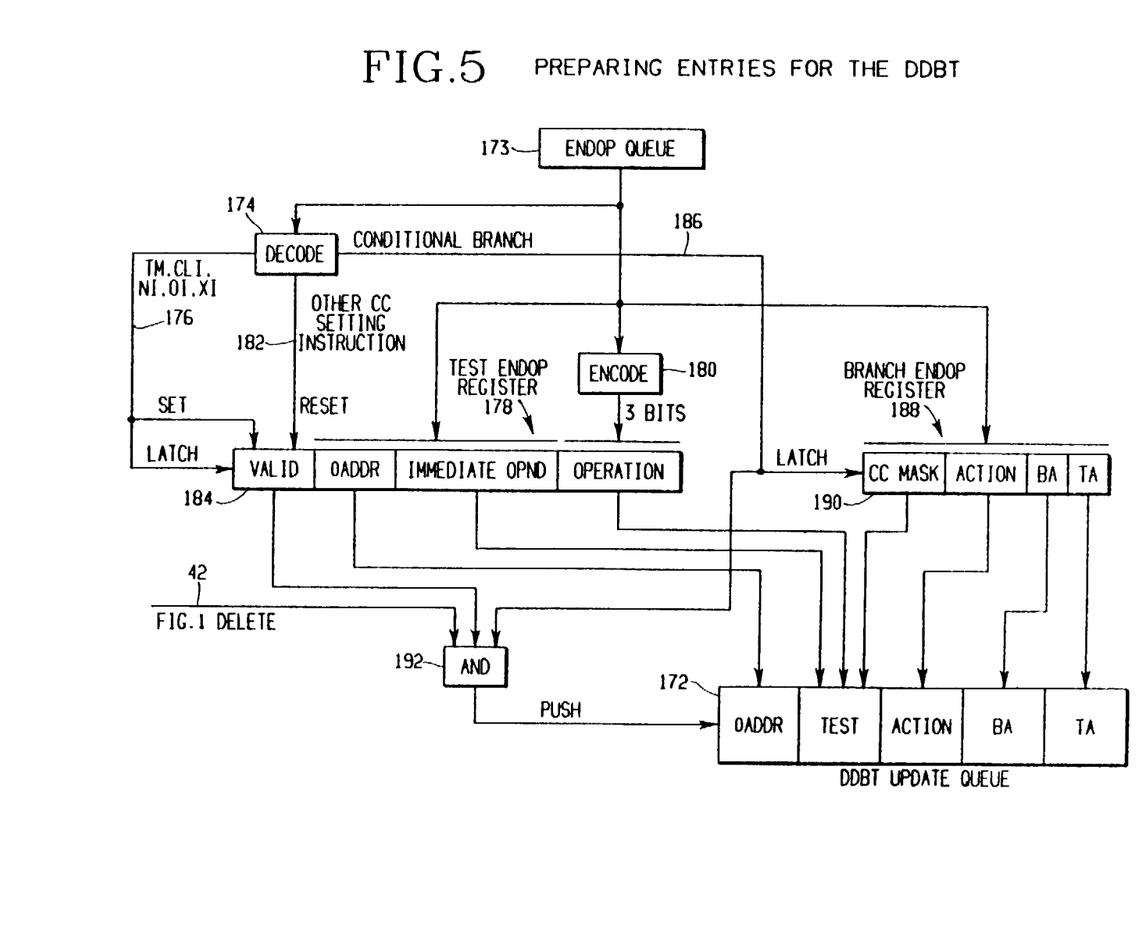
FIG. 5 is a block diagram representation of the logic for preparing entries for the data dependent branch table.

FIG. 5 shows how entries in the BHT that may benefit from the DDBT can be identified, and how appropriate DDBT entries can be assimilated and placed in the DDBT Update Queue (DUQ) 172. This can be accomplished via the processor endop queue 173. This is a queue that is kept internal to the processor, and its entries are records of all instructions that have been decoded, but not endopted. Many processors already have such a queue, so the DDBT does not require that any additional control within the processor be implemented, but only that the entries in the queue be expanded to contain certain fields that may not ordinarily be maintained.

The fields that are required by the DDBT are the instruction address, the first halfword of the instruction image, the operand address that was AGENed by the instruction (if appropriate), and in the case of a branch, whether or not the branch was taken. When an instruction endops, the opcode (first byte of the instruction image) is examined by a decoder 174 to determine whether the instruction is a relevant test instruction (TM, CLI, NI, OI, or XI), a conditional branch, or a condition code setting instruction other than the test instructions under consideration.

If the instruction is a test instruction as indicated on line 176, a Test Endop Register (TER) 178 is loaded with relevant information. This information is comprised of the immediate operand used in the test (second byte of the instruction image), the address of the memory operand that is tested (OADDR), and the type of test that is performed (Operation). In this case, Operation is a three bit field that is assimilated by an encoder 180 based on the opcode. Note that when the TER 178 is loaded, a VALID bit is set to signify that the instruction specified by the TER is the most recent condition code setting instruction that has endopted. Whenever a condition code setting instruction that is not one of the instructions under consideration endops as indicated on output line 182 from decoder 174, the VALID bit 184 is reset so that the instruction in the TER 178 will not erroneously be associated with a subsequent conditional branch.

When a conditional branch is endopted as indicated on output line 186 from decoder 174, a Branch Endop Register (BER) 188 is set just as in FIG. 1 with the BER 16, with the exception that the CC Mask field 190 (third nibble of the instruction image) is also loaded into the BER 188. If the VALID bit is set in the TER 178 at the time that the BER 188 is loaded, then the test instruction specified by the TER 178 is the condition code setting instruction for the conditional branch specified by the BER 188. AND circuit 192 tests for this condition. Quite arbitrarily, line 42 from FIG. 1 has been included as an input to this AND circuit. This is merely for economy in the DDBT, i.e., the DELETE signal 42 is an indication that the branch specified by the BER 188 has been mispredicted in the BHT. (Note that INSERT is not such an indication, since branches that have never been seen by the BHT will cause this status if they are taken.)

Thus, the AND circuit 192 pushes an entry onto the DUQ 172 when a mispredicted branch has been identified whose condition code setting instruction is one of the test instructions within the chosen DDBT implementation.

Figure 6A:
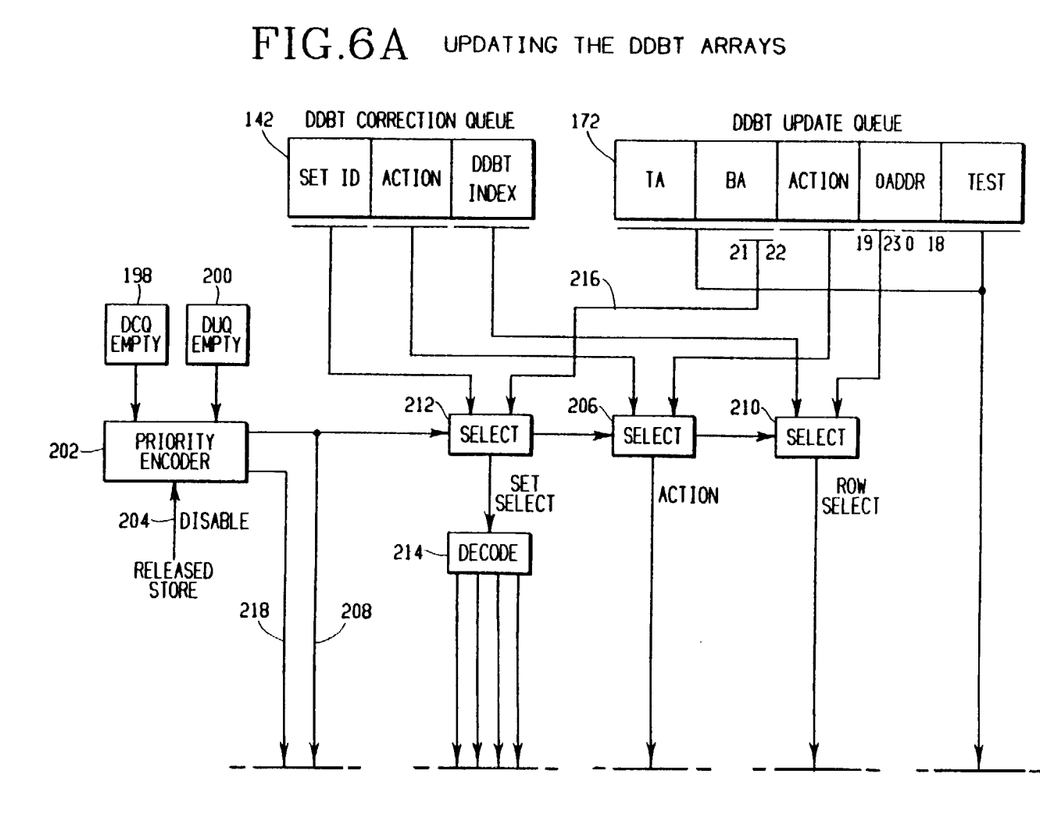
FIG. 6 is comprised of FIGS. 6A and 6B, viewed with FIG. 6A on the top and FIG. 6B on the bottom, and is a block diagram representation of the logic utilized for updating the data dependent branch table arrays.
Figure 6B:
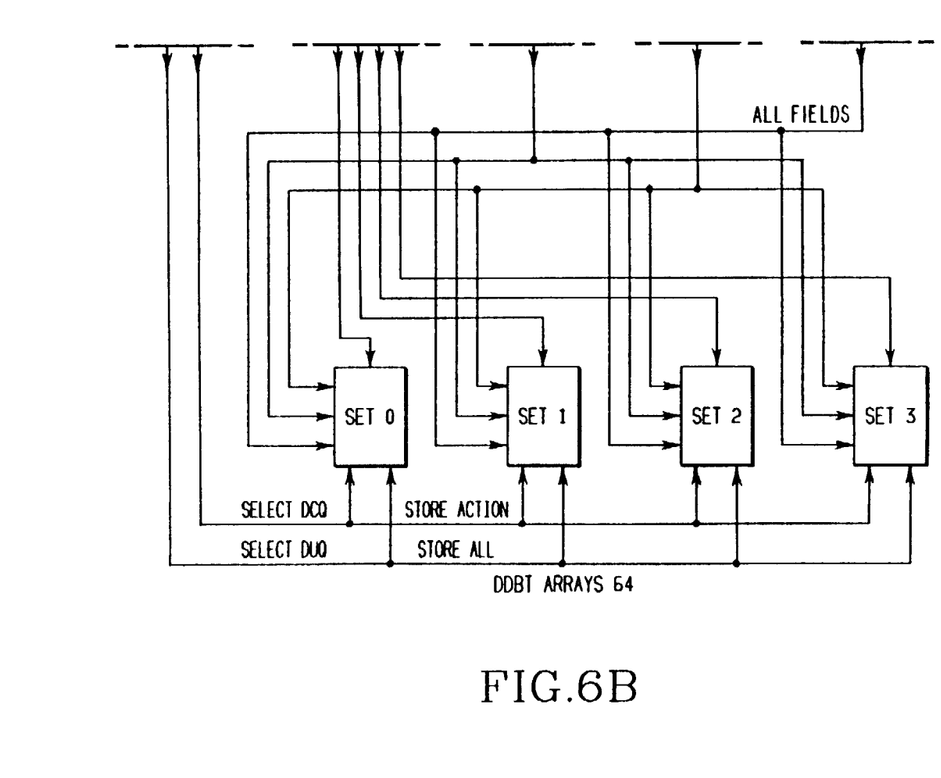

FIG. 6 shows how new entries are placed into the DDBT 64 from the DDBT Update Queue 172, and how existing entries in the DDBT are modified by the DDBT Correction Queue 142 (see FIG. 3). Returning to FIG. 6, status information in DCQ Empty register 198, and DUQ Empty register 200, is examined by a priority encoder 202 to determine whether to service the DCQ 142 or the DUQ 172. Arbitrarily, the encoder 202 disables the selection of either when a store is released as indicated on line 204 from the pending store buffer, so that the DDBT arrays are available for immediate testing (see FIG. 2). Thus, searching the DDBT has priority over updating the DDBT in this particular implementation.

When the priority encoder 202 elects to service the DCQ 142, it is only the ACTION bit that is gated through selector 206 by signal 208. Selector 210 does a row select on all four sets of the DDBT array using the DDBT Index field from the DCQ 142. The appropriate set is determined by the set ID field in the DCQ 142, and is gated through selector 212 where it is decoded by decoder 214 to produce a write enable for the appropriate set. Signal 208 produces a write pulse for the ACTION field only within the enabled set.

When the priority encoder 202 elects to service the DUQ 172, all fields need to be stored in the DDBT array. The ACTION field from the DUQ 172 is gated through selector 206, but all other relevant fields directly drive the DDBT array inputs. These fields are the target address (TA) and Branch address (BA), the TEST field, and bits 0 through 18 of OADDR. Bits 19 through 23 of OADDR are gated through selector 210 to provide a row address for all sets of the DDBT array, and bits 21 and 22 of the branch address (BA) on line 216 are gated through selector 212 where they are decoded by decoder 214 to produce a write enable for the appropriate set. Priority encoder 202 provides a write pulse 218 for all fields within the selected set.

THE DDBT is a passive mechanism that is independent of the BHT and the Processor, however it anticipates misprediction on the part of the BHT, and updates the BHT so as to avoid many branch wrong guesses. The particular implementation outlined above is exemplary only, and was chosen because it is simple to understand, however, a DDBT can be made arbitrarily elaborate. Within the class of DDBTs, there are very few design choices that are "wrong", i.e., issues such as robustness of tests covered, efficiency of operation, and timeliness of BHT update do not effect the workability of the design. These choices merely influence the number of BHT branch wrong guesses that may be avoided.

INDUSTRIAL APPLICABILITY

It is an object of the invention to provide an improved branch instruction prediction mechanism;

It is another object of the invention to provide an improved branch instruction prediction mechanism which utilizes a data dependant branch table in conjunction with a branch history table.

It is yet another object of the invention to provide an improved branch instruction prediction mechanism which utilizes a data dependent branch history table that is sensitive to those operands that will be tested in order to determine branch action outcomes. The data dependent branch table operates in conjunction with a branch history table to anticipate those instances where the branch history table will make an erroneous prediction, including means to correct the branch history table prior to the time the actual prediction is made.

What we claim as new and desire to secure by Letters Patent is:

1. In a computing machine, apparatus for predicting the outcome of branch instructions, the combination comprising:
    a processor;
    a memory for storing information to be processed by said processor, said information including instructions and operands;
    a branch history table for storing prior actions of branch instructions that are processed by said processor;
    means for detecting the occurrence of specific ones of said operands with specific ones of said branch instructions and with said prior actions of said branch instructions;
    means for determining specific occurrences of said branch instructions, and said prior actions resulting from said specific occurrences of said branch instructions;
    a storage means for storing said specific occurrences of branch instructions and said resulting actions;
    means for monitoring stores made to operands in said memory by said processor to determine if a given operand being stored to is one of said specific operands stored in said storage means; and
    means responsive to said specific occurrences of branch instructions and said resulting actions for determining, if the subsequent branch action of a given branch instruction in said storage means is different than the branch action of said given branch instruction in said branch history table, including means for updating the branch action of said given branch instruction in said branch history table, in the event that the branch actions differ.

2. In a computing machine, apparatus for predicting the outcome of branch instructions, the combination comprising:
    a processor;
    a memory for storing information to be processed by said processor, said information including instructions and operands;
    a branch history table (BHT) for storing prior branch actions of branch instructions which are processed by said processor;
    means for detecting occurrences of specific ones of said operands with specific ones of said branch instructions and with said prior actions of said branch instructions;
    means for determining specific occurrences of said branch instructions, and said prior actions resulting from said specific occurrences of said branch instructions;
    a data-dependent branch table (DDBT) for storing said specific occurrences of said branch instructions and said resulting actions, including addresses of said specific ones of said operands the addresses of said specific ones of said branch instructions, and said branch actions;
    first means for monitoring stores made to operands in said memory by said processor to determine if a given operand being stored to is one of said specific operands stored in said DDBT;
    second means responsive to said specific occurrences of branch instructions and said resulting actions for determining if the subsequent branch action of a given branch instruction in said DDBT is different than the branch action of said given branch instruction in said BHT; and
    third means for updating the branch action of said given branch instruction in said BHT, in the event the branch actions differ.

3. The combination claimed in claim 2, wherein said branch action includes the branch instruction address (BA) and the target instruction address (TA) specific occurrences of a branch instruction.

4. The combination claimed in claim 3, wherein said third means for updating includes means for updating whichever of BA and TA differ in the event the comparison of branch actions differ.

5. The combination claimed in claim 2, wherein said branch action includes an action bit which is indicative of whether or not said given branch instruction was taken on its last execution.

6. The combination claimed in claim 5, wherein said third means for updating includes means for updating said action bit in the event the comparison of action bits differ.

7. The combination claimed in claim 3, wherein said branch action includes an action bit which is indicative of whether or not said given branch instruction was taken on its last execution.

8. The combination claimed in claim 7, wherein said third means for updating includes means for updating whichever of BA, TA. or the action bit differ in the event the comparison of branch actions differ.

9. A method of processing branch instructions in a computing machine, wherein said computing machine includes a processor, a memory for storing information to be processed by said processor, said information including instructions and operands, a branch history table (BHT) for storing prior branch actions of instructions processed by said processor, and a data-dependent branch table (DDBT) that stores addresses of operands, addresses of branch instructions, branch actions of said branch instructions, and associations between specific ones of said operands and specific ones of said branch instructions, and said prior actions of said branch instructions; said method comprising the steps of:

- detecting the occurrences of specific ones of said operands with specific ones of said branch instructions and with said prior actions of said branch instructions;
- determining specific occurrences of said branch instructions, and said prior actions resulting from specific occurrences of said branch instructions;
- monitoring all stores made to operands stored in said memory by said processor to determine if a given operand being stored to is one of a said specific operands stored in said DDBT;
- responding to said specific occurrences of branch instructions and said resulting actions for determining if the subsequent branch action of a given branch instruction in said DDBT is different than the branch action of said given branch instruction in said BHT; and
- updating the branch action of said given branch instruction in said BHT, in the event the branch actions differ.

10. The method of claim 9, wherein said branch action includes the branch instruction address (BA) and the target instruction address (TA) of specific occurrences of a branch instruction, and said step of updating includes updating whichever of BA and TA differ in the event the comparison of branch actions differ.

11. The method of claim 9, wherein said branch action includes an action bit which is indicative of whether or not said given branch instruction was taken on its last execution, and said step of updating includes updating said action bit in said branch history table in the event the comparison of action bits differ.

12. The method of claim 10, wherein said branch action includes an action bit which is indicative of whether or not said given branch instruction was taken on its last execution, and said step of updating includes updating whichever of BA, TA or the action bit differ in the event the comparison of branch actions differ.

* * * * *